(12) United States Patent
Vallee

(10) Patent No.: US 10,279,648 B2
(45) Date of Patent: May 7, 2019

(54) HEAT EXCHANGER, PARTICULARLY FOR A MOTOR VEHICLE

(71) Applicant: Valeo Systemes Thermiques, Le Mesnil Saint Denis (FR)

(72) Inventor: Nicolas Vallee, Bazancourt (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 325 days.

(21) Appl. No.: 14/437,322

(22) PCT Filed: Oct. 22, 2013

(86) PCT No.: PCT/EP2013/072038
§ 371 (c)(1),
(2) Date: Apr. 21, 2015

(87) PCT Pub. No.: WO2014/064086
PCT Pub. Date: May 1, 2014

(65) Prior Publication Data
US 2015/0283875 A1    Oct. 8, 2015

(30) Foreign Application Priority Data
Oct. 25, 2012    (FR) ..................... 12 60192

(51) Int. Cl.
*B60H 1/00* (2006.01)
*F28F 9/00* (2006.01)
(Continued)

(52) U.S. Cl.
CPC ....... *B60H 1/00335* (2013.01); *F28D 9/0031* (2013.01); *F28F 9/00* (2013.01);
(Continued)

(58) Field of Classification Search
CPC ...... F28F 2210/08; F28F 2210/04; F28F 9/00; F28F 9/0219; F28F 9/0224; B60H 1/00335; F28D 9/0031
See application file for complete search history.

(56) References Cited

U.S. PATENT DOCUMENTS 1,347,436 A * 7/1920 Baumann ................. F01K 11/02
165/83
4,791,982 A * 12/1988 Meyerhofer .......... F28D 1/0408
165/148
(Continued)

FOREIGN PATENT DOCUMENTS

EP    2458312 A1 *  5/2012 ........... F28D 7/1684
FR    2831252 B1 *  2/2012 ............... F01N 5/02
(Continued)

OTHER PUBLICATIONS

International Search Report issued in PCT/EP2013/072038 dated May 8, 2014 (4 pages).

*Primary Examiner* — Tho V Duong
(74) *Attorney, Agent, or Firm* — Osha Liang LLP

(57) ABSTRACT

A heat exchanger for a motor vehicle is disclosed. The heat exchanger includes a bundle for a heat exchange between at least one first fluid and one second fluid, including first and second channels for the flow of the first fluid and of the second fluid, a housing for receiving the bundle, and a collector for the second fluid, including a collecting plate having openings into which the second channels lead, and at least one cover for closing the collector. The closing cover has a raised edge, and the collecting plate has a corresponding planar connecting portion adjacent to at least one peripheral edge of the collecting plate. The collecting plate has first openings having a first height and at least one second opening having a second height that is different from the first height.

8 Claims, 3 Drawing Sheets

(51) Int. Cl.
*F28F 9/02* (2006.01)
*F28D 9/00* (2006.01)
*F28D 7/16* (2006.01)

(52) U.S. Cl.
CPC .......... *F28F 9/0219* (2013.01); *F28F 9/0224* (2013.01); *F28D 7/1692* (2013.01)

(56) References Cited

U.S. PATENT DOCUMENTS

2003/0010479 A1    1/2003   Hayashi et al.
2005/0161206 A1    7/2005   Ambros et al.

FOREIGN PATENT DOCUMENTS

JP      2001-241872 A    9/2001
WO    2007/113320 A1    10/2007

\* cited by examiner

HEAT EXCHANGER, PARTICULARLY FOR A MOTOR VEHICLE

BACKGROUND

The invention relates to a heat exchanger, particularly for a motor vehicle.

A preferred field of use of the invention is that of supercharged heat engines, in particular of motor vehicles, which use a particular heat exchanger, further referred to as a charge air cooler (abbreviated to CAC), in order to cool a fluid, that is to say, the charge air of the engine.

This is because supercharged or turbo-compressed heat engines, in particular diesel engines, are supplied with compressed air, referred to as charge air, from a turbo-compressor which is actuated by the exhaust gases of the engine.

However, the effect of that compression is to heat the air which is at an excessively high temperature and it is desirable, for good operation of the engine, to cool it in order to reduce its temperature before it is introduced into the cylinders of the engine.

To that end, there is used, in conventional manner, a heat exchanger which is referred to as a charge air cooler.

The objective of that cooler is to cool the charge air by heat exchange with another fluid such as external air or a liquid such as glycol water of the cooling circuit of the engine, thereby forming an exchanger of the air/air or liquid/air type.

Such a cooler may be fitted in a selected location of the engine compartment, in particular near the engine, and particularly carries out the function of drawing in charge air toward each of the cylinders of the engine.

In known manner, a heat exchanger, and more specifically a charge air cooler, comprises heat exchange elements and fluid flow elements, in which fluids which exchange heat with each other flow.

A large number of associations of fluids may be envisaged, whether liquids and/or gases are involved. In particular, in the case of exchangers, referred to as charge air coolers, it is possible to provide a heat exchange between the charge air, which is intended to supply the engine of the vehicle, and a cooling fluid, in particular a cooling liquid, such as an admixture of water and glycol.

A large number of structural configurations may be envisaged.

There are known exchangers comprising a heat exchange bundle between the two fluids, such as the charge air and the cooling liquid, a receiving casing which receives the heat exchange bundle, and at least one collection tank for the gaseous fluid, such as the charge air, allowing the flow of the charge air through the exchanger.

According to a known solution, the heat exchange bundle comprises a stack of plates which are arranged parallel with each other in one or more rows parallel with each other, those plates being arranged in order to define, on the one hand, first flow channels for a first fluid and, on the other hand, second flow channels for a second fluid, exchanging heat with the first fluid.

Those plates may be alternating with elements for disrupting the flow of a fluid, for example, a gaseous fluid such as charge air.

In a known manner, the plates guide the cooling liquid in a circuit comprising one or more passes. Those plates are generally in the form of an elongate rectangle having two long sides and two short sides, and comprise two projections, a first of the projections having an inlet of the flow circuit for cooling liquid and the other of the projections having an outlet of the flow circuit of the cooling liquid, respectively. The projections are located along the same short side of the plate. The projections of a plate are intended to come into contact with the projections of an adjacent plate in order to allow the cooling liquid to pass from one flow channel to another.

In this manner, the cooling fluid is distributed between the plates by the inlet projections. It subsequently flows along the pass(es) of the flow circuits of the cooling liquid until it is discharged from the plates in the region of the outlet projections.

Each plate thus comprises a heat exchange zone between the cooling liquid and the charge air, which zone is located in the region of the flow pass(es), and an inlet/outlet zone which allows the cooling fluid to be introduced into and discharged from the plates.

A disadvantage of that configuration is that the zone in which the projections are located concentrates mechanical stresses which may bring about a breakage of the elements which are soldered together.

Furthermore, that zone having the projections is very detrimental to the thermal performance. This is because the charge air which passes through that zone does not pass via the exchange zone between the two fluids and therefore does not exchange or barely exchanges any heat with the cooling liquid.

It is known, in order to overcome this problem, to modify the components of the exchanger or to add an additional component which forms a screen and which allows the passage of the fluid to be cooled by that zone to be limited. However, that makes the components and/or the production process of the exchanger more complex, which may involve an additional cost and where applicable an increase in the weight of the exchanger.

In order to overcome those difficulties, there have already been envisaged by the Applicant in a patent application which has not yet been published heat exchangers comprising a cooling fluid collector, which is external with respect to the plates of the heat exchange bundle. The cooling fluid then supplies the heat exchanger, from the collector, via a collector plate through which flow channels of the cooling fluid of the heat exchange bundle open in the collector.

That arrangement requires the provision of enough connection space between the collector plate and at least one closure cover of the collector.

Furthermore, such a collector plate generally comprises flanges which surround the flow channels of the cooling fluid. Those flanges are involved in mechanically retaining the plates of the heat exchange bundle in relation to the casing.

However, those flanges require the provision of additional connection space for assembling the collector plate on the walls of the casing and the closure cover of the collector, which space is substantial.

SUMMARY OF DISCLOSURE

An objective of the invention is to overcome those disadvantages of the prior art and to provide a heat exchanger having good levels of effectiveness in terms of heat exchange while improving the assembly between a closure cover of the collector and the collector plate.

To that end, the invention relates to a heat exchanger for a motor vehicle, comprising:

a heat exchange bundle between at least a first fluid and a second fluid comprising first flow channels of the first fluid and second flow channels of the second fluid, a receiving casing of the bundle, and a collector for the second fluid comprising: a collector plate having openings in which the second flow channels of the second fluid open, and at least one closure cover of the collector for the second fluid, characterized in that:

the at least one closure cover of the collector has at least one raised edge and the collector plate has a corresponding planar connection portion, the planar connection portion being adjacent to at least one peripheral edge of the collector plate, and in that the collector plate has a predefined number of first openings having a first depth and at least one second opening having a second depth which is different from the first depth.

In this manner, the connection between the closure cover of the collector and the collector plate is carried out in the planar state.

Furthermore, with the depth of at least one opening of the collector plate being adapted, for example, by reducing the depth of at least one of those openings, the remaining material of the collector plate for producing a connection portion for assembling the closure cover of the collector is greater.

Consequently, the fixing zone is greater and, in the case of assembly by soldering, the soldering strength is improved.

Furthermore, the cooperation between that connection portion of the collector plate and a corresponding raised edge of the closure cover of the collector allows assembly near the end openings of the collector plate which do not have any flanges. It is possible to obtain an increase in material in relation to the solutions of the prior art having flanges, and thereby to reduce the cost.

The exchanger may further comprise one or more of the following features, taken separately or together:

the difference in depth is greater than or equal to 0.2 mm,
the second depth is less than the first depth,
the first depth is in the order of 4 mm and the second depth is in the order of 3.5 mm,
the collector plate has at least two second openings which are arranged side by side,
the at least one second opening is arranged at an end of the collector plate,
the corresponding raised edge of the at least one closure cover of the collector has a substantially planar surface which cooperates with the planar connection portion,
the casing has at least two side walls, and at least two upper and lower closure walls, and the collector plate forms a side wall of the casing,
the collector plate has at least one raised edge which is adjacent to the connection portion and which cooperates with a closure wall of the casing,
the raised edge of the collector plate has a substantially planar surface which cooperates with a substantially planar surface of the closure wall of the casing,
the exchanger comprises a collection tank for the first fluid, which tank is formed on a side wall of the casing,
the heat exchange bundle comprises a stack of plates which have a raised end edge which is fixed to the edge of the openings of the collector plate, respectively,
the exchanger is assembled by soldering.

Other features and advantages of the invention will be appreciated more clearly from a reading of the following description which is given purely by way of non-limiting example, and the appended drawings.

DETAILED DESCRIPTION

Figure 1A:
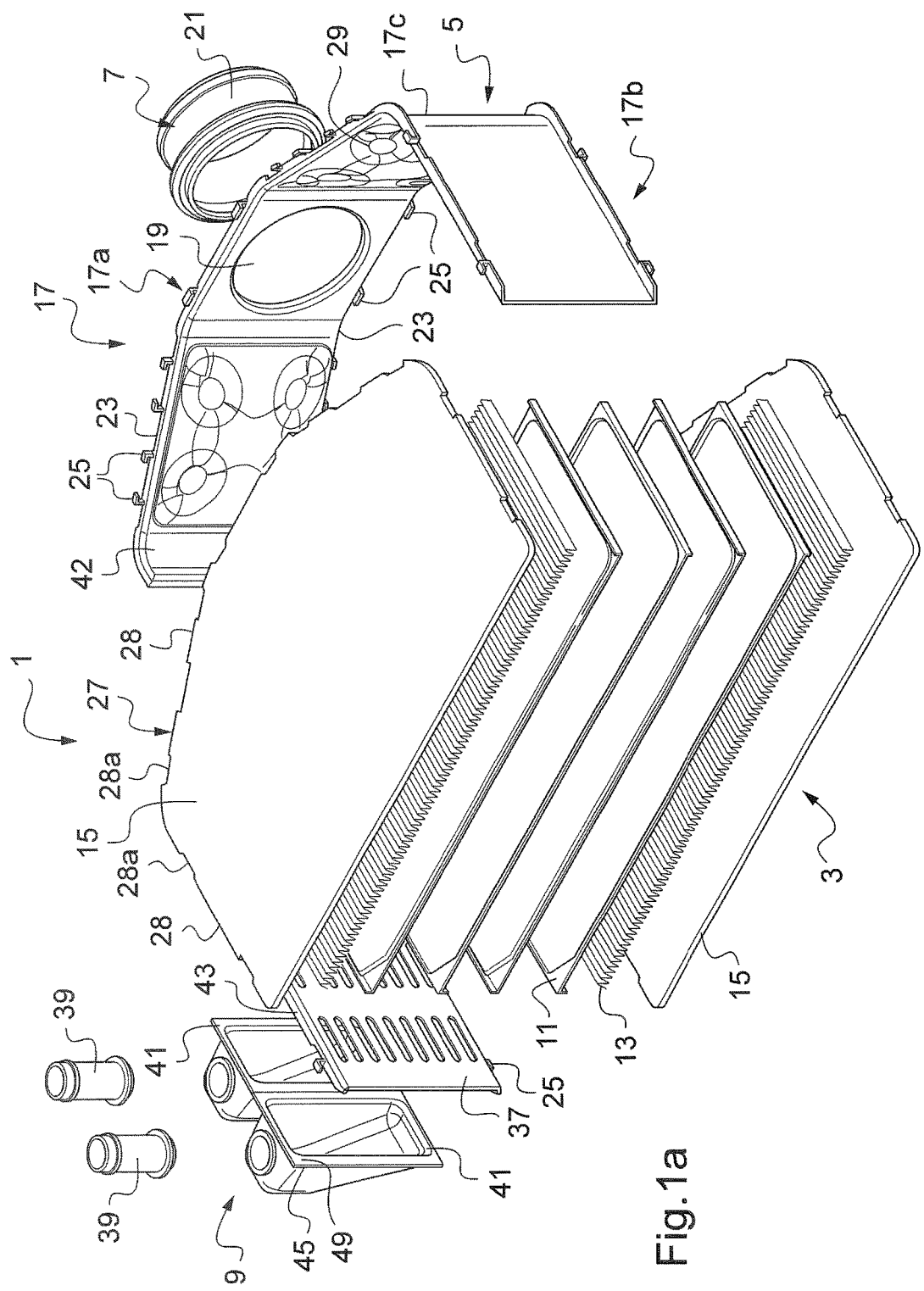
FIG. 1a is an exploded perspective view which partially shows a heat exchanger comprising a casing according to a first embodiment.

In these figures, elements which are substantially identical have the same reference numerals.

The invention relates to a heat exchanger, in particular for cooling the charge air for a heat engine, such as a diesel engine of a motor vehicle.

Such an exchanger may be a so-called "air/water" exchanger, that is to say, an exchanger in which the fluids which exchange heat are air and water. In the case of a charge air cooler, the water is preferably so-called "low-temperature" water from the cooling circuit of the engine; this is typically glycol water, that is to say, an admixture of water and glycol.

Naturally, the invention is not limited to charge air coolers of motor vehicles and may be applied to other types of heat exchangers.

FIG. 1a illustrates a heat exchanger 1 according to a first embodiment.

This is, for example, a charge air cooler for an engine of the motor vehicle. Such an exchanger 1 may be fixed to the cylinder head of the engine (not illustrated) in order to allow cooled air to be drawn into the engine. To this end, the exchanger 1 may comprise an air intake tank (not illustrated) which is capable of being fixed to cylinder head of the engine (not illustrated).

That exchanger 1 comprises:

a heat exchange bundle 3 between a first fluid such as charge air and a second fluid such as the cooling fluid, for example, glycol water,
a casing 5 for receiving the exchange bundle 3,
at least one collection tank 7 of the first fluid, in this instance charge air, and
a collector 9 of the second fluid, in this instance glycol water.

The bundle 3 has, for example, a generally substantially parallelepipedal form with two opposing long sides and two opposing short sides.

The bundle 3 comprises a stack of planar tubes.

According to the embodiment described, all the planar tubes are identical.

Each tube is, for example, formed by the assembly of a pair of plates 11 facing each other. The exchanger 1 is therefore of the plate type.

A plate 11 has a generally rectangular form. They are, for example, dished plates 11.

The plates 11 are, for example, produced from aluminum or an aluminum alloy.

Figure 2:
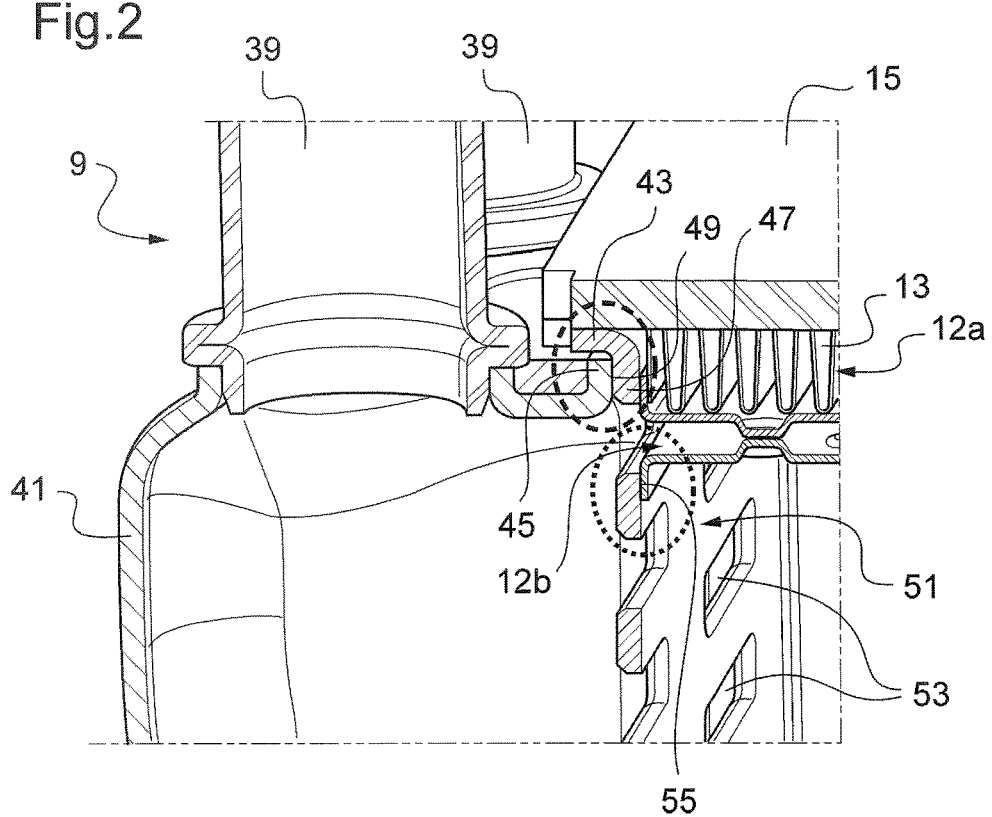
FIG. 2 is a partial cross-section of the heat exchanger.

With reference to FIG. 2, the stack of plates 11 allows delimitation, on the one hand, of first channels 12a for the flow of the first fluid, in this instance air, and, on the other hand, of second channels 12b for the flow of the second fluid, in this instance the cooling fluid such as glycol water.

The first channels 12a for the flow of air are defined between two pairs of plates 11.

The assembled plates 11 together define a passage for the flow of a fluid, in particular the cooling fluid, such as glycol water. Such a passage may have a substantially constant thickness. That passage forms a second channel 12b for the flow of glycol water in our example.

In this manner, the plates 11 assembled in pairs together delimit alternating flow channels 12b, 12a, on the one hand, for a cooling fluid, most often cooling glycol water of the circuit of the engine, and, on the other hand, for the charge air to be cooled.

The planar tubes may be arranged alternately with interposed members 13 (cf. FIGS. 1a, 2). The interposed members 13 are therefore arranged in the first channels 12a for the flow of air in our example.

An interposed member 13 is, for example, formed from a thin corrugated sheet which conducts heat and whose tips are in contact alternately with the two planar tubes at one side and the other of the interposed member 13. It is, for example, a sheet of aluminum or an aluminum alloy.

A flow of air may flow through the interposed members 13 in order to exchange heat with the fluid, in this instance glycol water, which flows in the planar tubes. The interposed members 13 disrupt the flow of the air so as to increase the exchange surface.

The interposed members 13 therefore form disruption elements. The disruption allows the heat exchanges between the air and glycol water through the walls of the plates 11 to be made easier.

As mentioned above, the exchange bundle 3 is received in a casing 5.

The casing 5 is, for example, produced from an aluminum alloy.

According to the example illustrated, the casing 5 comprises, for example:
  two closure plates 15, at one side and the other of the bundle 3 in the stacking direction of the plates 11, and
  at least one side wall 17 which connects the two closure plates 15.

The casing 5 comprises an upper closure plate and a lower closure plate. The upper plate may be substantially planar. Similarly, the lower plate may be substantially planar.

As illustrated in FIG. 1a, the casing 5 may have a substantially L-shaped side wall 17.

According to the first embodiment illustrated in FIG. 1a, that side wall 17 comprises a first portion 17a which is located in the region of the inlet of the charge air in relation to the air flow direction. Therefore, reference may be made to the first front portion 17a in relation to the fluid flow direction.

That first front portion 17a closes a long side of the bundle 3 according to the example illustrated.

The substantially L-shaped side wall 17 has a second end portion 17b. That second end portion 17b closes a short side of the bundle 3 according to the example illustrated.

The first front portion 17a and the second end portion 17b of the side wall 17 are produced in one piece according to the embodiment illustrated in FIG. 1a.

The first front portion 17a and the second end portion 17b may be connected by a connection portion 17c which is substantially rounded.

Furthermore, according to the embodiment described, the collection tank 7 is integrated in the casing 5. That collection tank 7 is connected to an air circuit in which the exchanger 1 is mounted. Therefore, the air is introduced into the plates 11 via the collection tank 7.

The collection tank 7 comprises a hole 19 which is formed in the casing 5, more specifically in the front portion 17a of the side wall 17, and that hole 19 communicates with a pipe 21. The pipe is in particular a projecting pipe 21.

Furthermore, the side wall 17 has connection zones with respect to the upper and lower plates 15.

According to the example illustrated, the side wall 17 has at the peripheral edges 23 thereof retention tabs 25 which are folded for connection to the upper and lower plates 15. The upper and lower plates 15 have an edge 27, respectively, which has a shape corresponding to a peripheral edge 23 of the side wall 17 for fixing by means of form-fitting. The peripheral edges 23 of the side wall 17 are retained on the upper and lower plates 15, for example, by crimping.

According to the example illustrated, an edge 27 of an upper or lower closure plate 15 has projections 28 which are, for example, substantially rectangular and at which there are folded so as to face each other two associated retention tabs 25 of the peripheral edge 23 of the side wall 17. More specifically, the edge 27 has an alternating sequence of projections 28 and discontinuities 28a.

The assembly may be soldered subsequently.

Furthermore, the side wall 17 may have at least one substantially convex surface 29 which is adjacent to the air intake.

According to the example illustrated, the side wall 17 has two substantially convex surfaces 29 at one side and the other of the air intake. In particular, the front portion 17a of the side wall 17 is the member which has those two substantially convex surfaces 29.

The convexity of the surfaces 29 may be orientated in the general direction of stresses which are applied to the casing 5 during the flow of the charge air.

Those convex surfaces 29 may extend substantially over the entire height of the side wall 17.

Such convex surfaces 29 particularly allow limitation of the movement of the surface of the side wall 17 during the flow of the charge air.

Figure 1B:
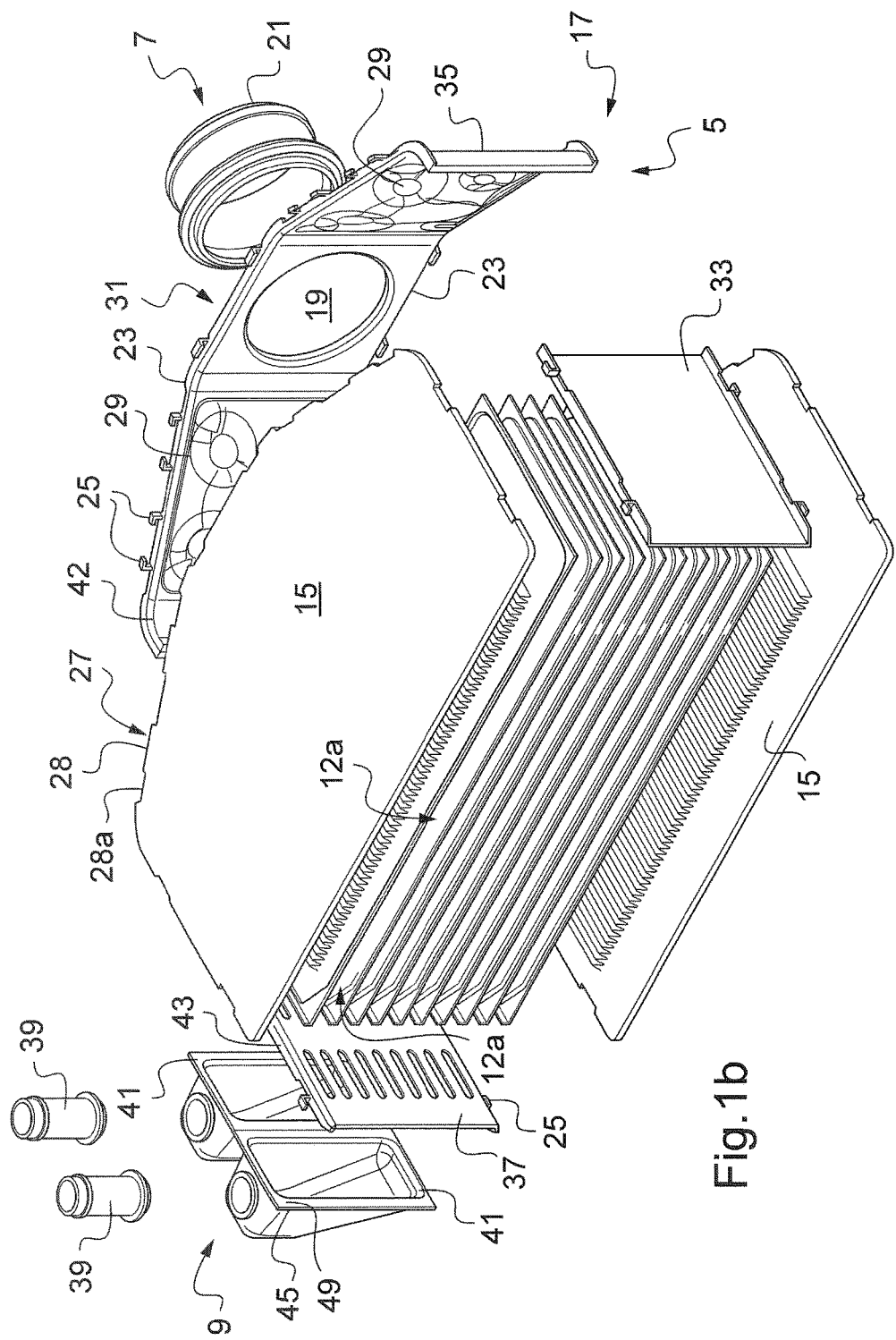
FIG. 1b is an exploded perspective view which partially shows a heat exchanger comprising a casing according to a second embodiment.

According to a second embodiment illustrated in FIG. 1b, the casing 5 no longer has one side wall 17, but instead has at least two side walls: a first front wall 31 and at least one second longitudinal end wall 33.

According to this example, the first front wall 31 is located in the region of the inlet of the charge air in relation to the air flow direction and the collection tank 7 is integrated in that first front wall 31.

Furthermore, the first front wall 31 has at the peripheral edges 23 thereof retention tabs 25 which are folded for connection to the upper and lower plates 15.

The first front wall 31 may have a rounded edge 35 which is capable of being assembled on the longitudinal end wall 33.

Furthermore, that first front portion 31 may have one or more substantially convex surfaces 29 which are adjacent to the air intake as described above with reference to FIG. 1a.

The front wall 31 closes a long side of the bundle 3 according to the example illustrated, and the end wall closes a short side of the bundle 3.

The front wall 31 is similar to the front portion 17a of the side wall 17 described with reference to FIG. 1a, and the longitudinal end wall 33 is similar to the end portion 17b of the side wall 17 described with reference to FIG. 1a.

Furthermore, the exchanger 1 comprises a collector 9 in order to allow the flow of the second fluid, such as glycol water, in the exchanger 1. That collector 9 is, for example, fitted to the casing 5.

The collector 9 comprises a collector plate 37, water inlet and outlet pipes 39 in the exchanger 1, which are associated with a water circuit in which the exchanger 1 is mounted and which communicate with the collector plate 37, respectively, and at least one cover 41 which closes the collector 9.

The collector plate 37 is arranged in the region of a short side of the bundle 3. The collector plate 37 is, according to the example illustrated in FIG. 1a, arranged opposite the end portion 17b of the side wall 17 of the casing 5 and, according to the example illustrated in FIG. 1b, the collector plate 37 is arranged opposite the longitudinal end wall 33 of the casing 5.

That collector plate 37 is assembled on the casing 5, for example, by soldering, and forms a side wall of the casing 5: a longitudinal end wall of the casing 5 in our example. The collector plate 37 may be produced from aluminum or an aluminum alloy.

With reference to FIGS. 1a and 1b, the collector plate 37 may be assembled on a substantially rounded edge 42 of the side wall 17 of the casing 5.

Furthermore, the collector plate 37 comprises at least one raised peripheral edge 43 which is capable of moving into abutment against a closure plate 15 of the casing 5. In particular, that raised peripheral edge 43 is capable of moving into abutment with a substantially planar edge of the upper or lower closure plate 15.

The raised peripheral edge 43 is, according to the embodiment illustrated, folded through substantially 90° and orientated toward the covers 41 of the collector 9.

The peripheral edge 43 may have a substantially planar surface opposite the upper or lower plate 15 so as to form a planar connection portion which is capable of being fixedly joined to the upper or lower plate 15 of the casing 5.

According to the example illustrated in FIG. 1a, and in FIG. 1b, the collector plate 37 has two opposing raised edges 43 which are intended for fixing, on the one hand, with respect to the upper closure plate 15 and, on the other hand, with respect to the lower closure plate 15.

According to the example illustrated, the collector 9 comprises two fluid-tight covers 41 which are respectively associated with a pipe 39 and fixed to the collector plate 37 so as to form an inlet collection tank and an outlet collection tank of the second fluid, in this instance glycol water.

That fixing is, for example, obtained by means of soldering. The covers 41 may also be produced from aluminum or aluminum alloy.

To that end, a cover 41 has a peripheral fixing edge 45 which cooperates with at least one corresponding connection portion 47 of the collector plate 37, which can better be seen in FIG. 2.

A connection portion 47 of the collector plate is therefore capable of being fixedly joined to an associated cover 41 of the collector 9.

With reference to FIGS. 1a, 1b, the collector plate 37 has two connection portions 47 at the ends of the collector plate 37 and adjacent to a raised peripheral edge 43 of the collector plate 37.

A connection portion 47 may have a substantially planar surface opposite the collector 9 so as to form a planar connection portion which is capable of being fixedly joined to the covers 41.

The corresponding peripheral fixing edge 45 of a cover 41 may itself be folded substantially through 90°.

Furthermore, the raised edge 45 of a cover 41 is arranged so as to move into abutment against a connection portion 47, which is in this instance substantially planar, of the collector plate 37.

That raised fixing edge 45 of a cover 41 may have a planar surface 49 which is intended to be fixedly joined to the collector plate 37.

In particular, the connection portions 47 of the collector plate 37 and the corresponding edge 45 of a cover(s) 41 have a planar surface, respectively, so that the fixing between the collector plate 37 and a cover 41 is brought about in a substantially planar manner.

The planar cooperation zone between a cover 41 and the collector plate 37 is surrounded by dashes in FIG. 2. In the case of assembly by means of soldering, reference may also be made to a soldering flat.

Figure 3:
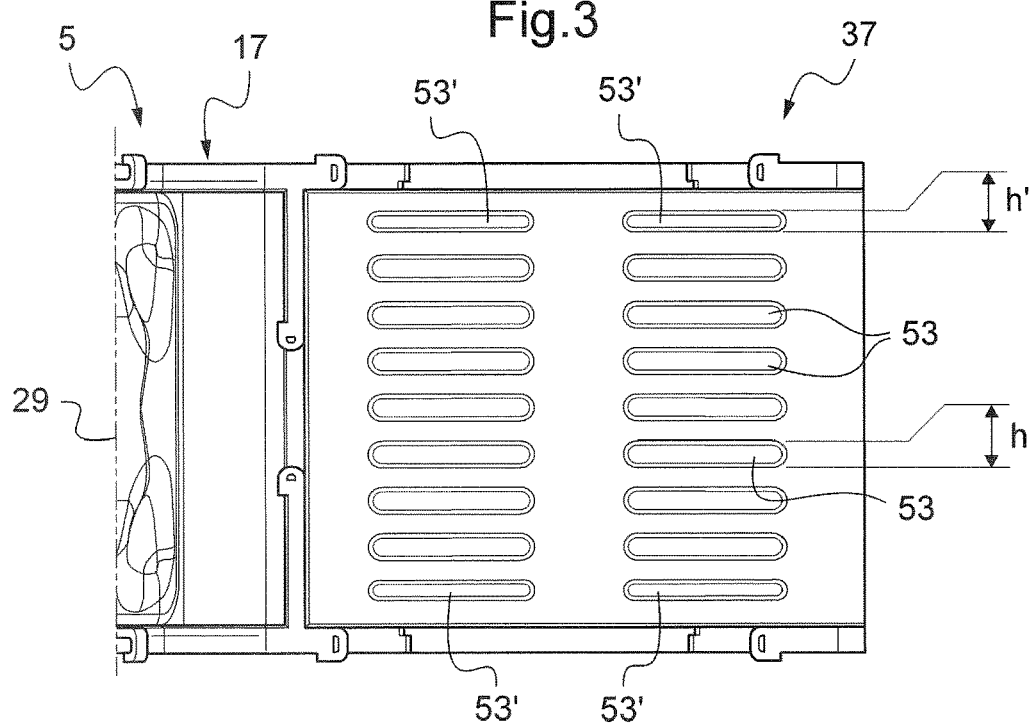
FIG. 3 illustrates a collector plate of a collector of the heat exchanger.

Furthermore, the collector plate 37 has an openwork central portion 51 which has openings 53, 53' (cf. FIGS. 2 and 3). The central portion 51 may be substantially planar.

According to the embodiment described, the collector plate 37 has a substantially planar central portion 51 and two peripheral edges 43 which are raised through substantially 90° so that the collector plate 37 is substantially U-shaped in cross-section, the raised edges 43 forming the two members of the "U".

The plates 11 are arranged so that the second flow channels 12b of the second fluid, such as glycol water, open into the openings 53, 53' of the collector plate 37. Only two assembled plates 11 are illustrated in FIG. 2.

With reference to FIG. 3, the collector plate 37 has, for example, a first column of openings 53, 53' and a second column of openings 53, 53'. A column of openings 53, 53' is arranged so as to communicate with an associated cover 41 which delimits the inlet or outlet collection tank of the second fluid, such as glycol water.

Furthermore, the openings 53, 53' of the collector plate 37 have different depths. This is because the collector plate 37 may comprise first openings 53 which have a first depth h and at least one second opening 53' which has a second depth h' which is different from the first depth h.

In particular, a second opening 53' has a second depth h' which is less than the first depth h.

The first depth h of the first openings 53 may correspond to a construction standard for collection plates 37 in the field of heat exchangers.

That depth reduction allows a connection portion 47 of the collector plate 37 to be obtained that is larger in relation to known solutions for the soldering between the collector plate 37 and a cover 41, in the region of the cooperation zone surrounded by dashes in FIG. 2. The reduction of at least one opening 53' of the collector plate 37 therefore allows an improvement of the assembly of the collector 9, in particular the covers 41, on the collector plate 37. The soldering strength is thereby improved.

According to a preferred embodiment, the difference in depth between a first opening 53 and a second opening 53' is at least 0.2 mm. That value corresponds to the tolerance of the collection plates 37 in the field of heat exchangers.

By way of an illustrative example, a first opening 53 has, for example, a first depth h in the order of 4 mm and a second opening 53' has, for example, a second depth h' in the order of 3.5 mm.

The Applicant has established that such a difference in depth does not influence the effectiveness of the heat exchanger 1. This is because the effectiveness of the heat exchanger 1 is not impaired, in particular in terms of a loss of charge and distribution of the flow. To that end, the difference in depth must not be greater than an upper limit. It is possible to provide for that upper limit to be in the order of half of the first depth h corresponding, for example, to a standard in the field of collection plates of heat exchangers.

Furthermore, it is possible to provide a single opening 53' having a depth h' different from the other openings 53.

That opening 53' may be arranged equally well at an end of the collector plate 37 or at the center of the collector plate 37.

It is also possible to provide more than one opening 53' having a depth h'. By way of example, it is possible to provide two openings 53' side by side communicating respectively with the inlet pipe 39 and the outlet pipe 39 of the collector 9. Naturally, by way of a variant, it is possible to have two openings side by side, including a first opening 53 having a first depth h and a second opening 53' having a second depth h'.

According to the example illustrated in FIG. 3, the upper and lower end openings 53' of the collector plate 37 are second openings 53' having a second depth h' which is smaller than the depth h of the first openings 53 in the remainder of the collector plate 37.

Furthermore, the plates 11 are assembled, for example, by soldering, on the collector plate 37. The assembly zone between a plate 11 and the collector plate 37 is surrounded by dots in FIG. 2.

To that end, the plates 11 have a raised end edge 55 which is capable of being assembled on the collector plate 37, respectively.

The raised end edge 55 is, according to the embodiment illustrated, folded through substantially 90°.

With reference to FIG. 2, the end edges 55 of the plates 11 of a pair of plates 11 defining a second flow channel 12b for the second fluid, in this instance glycol water, are orientated in two opposite directions. It should be noted in FIG. 2 that an end edge 55 of a plate 11 is orientated toward the first flow channel 12a for the adjacent first fluid. In other words, an end edge 55 is orientated either upward or downward with reference to FIG. 2.

That end edge 55 therefore defines a cooperation surface with the collector plate 37, for example, with the edge of the openings 53 or 53' of the collector plate 37.

Furthermore, the end edge 55 of a plate 11 may be substantially planar so as to form a planar connection portion which is capable of being fixedly joined to the collector plate 37.

According to the example illustrated in FIG. 2, the end edges 55 of the plates 11 are planar and are arranged so as to move around the edges of the openings 53 or 53' of the collector plate 37.

With this configuration, it is not necessary to provide flanges around the openings 53, 53' of the collector plate 37.

In this manner, according to the embodiment illustrated in FIG. 2, there is, at one side and the other of the collector plate 37, on the one hand, a planar edge 45 of the collector 9 and, on the other hand, the planar end edges 55 of the plates 11.

The assembly formed by the plates 11, where applicable the corrugated interposed members 13, the collector 9, the collector plate 37 and the casing 5, may therefore be soldered.

Therefore, it may be understood that such a heat exchanger 1, comprising a collector 9 as defined above with a collector plate 37 having openings 53, 53' having a variable depth, allows an increase in the soldering zone between the covers 41 and the collector plate 37 of the collector, and thereby an improvement in the soldering strength while maintaining the effectiveness of the heat exchanger 1. This is because the connection portion 47 may be increased in relation to a collector plate 37 which has openings of the same depth, the dimensions of the collector plate 37 being defined, for example, according to a standard in the field of heat exchangers.

Furthermore, the planar connection between the covers 41 and the collector plate 37 allows a reliable fluid-tight connection to be obtained between the covers 41 and the collector plate 37.

Finally, the connection between the covers 41 and the collector plate 37, as a result of the connection portion 47, may be brought about in the region of the openings 53, 53' of the collector plate 37 and those openings 53, 53' do not have any flanges, which also contributes to increasing the soldering zone between the covers 41 and the collector plate 37.

What is claimed:

1. A heat exchanger for a motor vehicle, comprising:
   a heat exchange bundle between at least a first fluid and a second fluid comprising first flow channels of the first fluid and second flow channels of the second fluid,
   a receiving casing of the bundle; and
   a collector for the second fluid comprising:
      a collector plate having openings, in which the second flow channels of the second fluid open,
      two closure covers of the collector for the second fluid, and
      inlet and outlet pipes,
      wherein the two closure covers are respectively associated with the inlet and outlet pipes and fixed to the collector plate to form an inlet collection tank and an outlet collection tank of the second fluid,
   wherein:
   the closure covers of the collector has at least one raised edge and the collector plate has a corresponding planar connection portion, the planar connection portion being adjacent to at least one peripheral edge of the collector plate and facing the closure covers of the collector,
   the collector plate has a predefined number of first slot-shaped openings each having a first width and at least one second slot-shaped opening having a second width which is less than the first width,
   the first slot-shaped openings and the at least one second slot-shaped opening are oriented lengthwise in parallel to a section of the planar connection portion,
   the at least one second slot-shaped opening is closer to the section of the planar connection portion than any one of the first slot-shaped openings, and
   wherein the casing has at least two side walls, at least an upper closure wall and a lower closure wall, wherein the collector plate forms a side wall of the casing, a collection tank for the first fluid is integrated in the casing, and wherein the collection tank is perpendicular to the heat exchange bundle.

2. The exchanger as claimed in claim 1, wherein the collector plate has at least two second openings which are arranged side by side.

3. The exchanger as claimed in claim 1, wherein the at least one second opening is arranged at an end of the collector plate.

4. The exchanger as claimed in claim 1, wherein the corresponding raised edge of the closure covers of the collector has a planar surface which cooperates with the planar connection portion.

5. The exchanger as claimed in claim 1, wherein the collector plate has at least one raised peripheral edge which is adjacent to the planar connection portion and which cooperates with a closure wall of the casing.

6. The exchanger as claimed in claim 5, wherein the raised peripheral edge of the collector plate has a planar surface which cooperates with a planar surface of the closure wall of the casing.

7. The exchanger as claimed in claim 1, wherein the heat exchange bundle comprises a stack of plates which have a raised end edge which is fixed to the edge of the openings of the collector plate, respectively.

8. A heat exchanger for a motor vehicle, comprising:
a heat exchange bundle between at least a first fluid and a second fluid comprising first flow channels of the first fluid and second flow channels of the second fluid,
a receiving casing of the bundle; and
a collector for the second fluid comprising:
  a collector plate having openings, in which the second flow channels of the second fluid open,
  two closure covers of the collector for the second fluid, and
  water inlet and outlet pipes,
    wherein the two closure covers are respectively associated with the water inlet and outlet pipes and fixed to the collector plate to form an inlet collection tank and an outlet collection tank of the second fluid,
wherein:
the closure covers of the collector has at least one raised edge and the collector plate has a corresponding planar connection portion, the planar connection portion being adjacent to at least one peripheral edge of the collector plate and facing the closure cover of the collector,
the collector plate has a predefined number of first slot-shaped openings each having a first width and at least one second slot-shaped opening having a second width which is less than the first width,
the at least one second opening is arranged at an end of the collector plate, and
wherein the casing has at least two side walls, at least an upper closure wall and a lower closure wall, wherein the collector plate forms a side wall of the casing, a collection tank for the first fluid is integrated in the casing, and wherein the collection tank is perpendicular to the heat exchange bundle.

* * * * *